US012762425B2

(12) United States Patent
Solinas et al.

(10) Patent No.: US 12,762,425 B2
(45) Date of Patent: Oct. 13, 2026

(54) DEVICE AND METHOD FOR TRANSFERRING KNOWLEDGE OF AN ARTIFICIAL NEURAL NETWORK

(71) Applicants: Commissariat à l'Énergie Atomique et aux Énergies Alternatives, Paris (FR); Universite Grenoble Alpes, Saint Matrin d'Heres (FR); Centre National de la Recherche Scientifique, Paris (FR); Université de Chambéry—Université Savoie Mont Blanc, Chambery Cedex (FR)

(72) Inventors: Miquel Angel Solinas, Grenoble Cedex (FR); Marina Reyboz, Grenoble Cedex (FR); Stephane Rousset, Grenoble (FR); Martial Mermillod, Pontcharra (FR); Clovis Galiez, Saint Martin d'Heres (FR)

(73) Assignees: Commissariat à l'Énergie Atomique et aux Énergies Alternatives, Paris (FR); Universite Grenoble Alpes, Saint Martin D'Heres (FR); Centre National de la Recherche Scientifique, Paris (FR); Université de Chambéry—Université Savoie Mont Blanc, Chambery Cedex (FR)

( * ) Notice: Subject to any disclaimer, the term of this patent is extended or adjusted under 35 U.S.C. 154(b) by 1012 days.

(21) Appl. No.: 17/916,132

(22) PCT Filed: Apr. 1, 2021

(86) PCT No.: PCT/EP2021/058631

§ 371 (c)(1),
(2) Date: Sep. 30, 2022

(87) PCT Pub. No.: WO2021/198426

PCT Pub. Date: Oct. 7, 2021

(65) Prior Publication Data

US 2023/0153632 A1 May 18, 2023

(30) Foreign Application Priority Data

Apr. 2, 2020 (FR) ...................................... 2003326
Sep. 11, 2020 (FR) ...................................... 2009220

(51) Int. Cl.
*G06N 3/096* (2023.01)
*G06F 18/211* (2023.01)
*G06F 18/214* (2023.01)

(52) U.S. Cl.
CPC ........... *G06N 3/096* (2023.01); *G06F 18/211* (2023.01); *G06F 18/214* (2023.01)

(58) Field of Classification Search
CPC ...... G06N 3/096; G06N 3/045; G06N 3/0455; G06N 3/048; G06N 3/0499; G06N 3/088;
(Continued)

(56) References Cited

U.S. PATENT DOCUMENTS

2019/0135300 A1* 5/2019 Gonzalez Aguirre ....................... G06N 3/0464
2019/0244060 A1* 8/2019 Dundar ................ G06V 10/955
(Continued)

OTHER PUBLICATIONS

Ans & Rousset, "Neural networks with a self-refreshing memory: knowledge transfer in sequential learning tasks without catastrophic forgetting", 2000 (Year: 2000).*
(Continued)

*Primary Examiner* — Usmaan Saeed
*Assistant Examiner* — Alvaro S Laham Bauzo
(74) *Attorney, Agent, or Firm* — Wolf, Greenfield & Sacks, P.C.

(57) ABSTRACT

A method of generating training data for transferring knowledge from a trained artificial neural network to a further
(Continued)

artificial neural network, the method including: a) injecting a first sample into the trained artificial neural network; b) reinjecting a pseudo sample, generated based on a replicated sample present at the one or more outputs of the trained artificial neural network, into the trained artificial neural network in order to generate a new replicated sample; and c) repeating b) one or more times, wherein the training data for training the further artificial neural network includes at least two of the reinjected pseudo samples originating from the same first sample and corresponding output values generated by the trained artificial neural network.

20 Claims, 8 Drawing Sheets

(58) Field of Classification Search
CPC ........ G06N 3/0895; G06N 3/09; G06N 3/084; G06F 18/211; G06F 18/214
See application file for complete search history.

(56) References Cited

U.S. PATENT DOCUMENTS

| | | | | |
|---|---|---|---|---|
| 2020/0134426 A1* | 4/2020 | Ketz | .................... | G06N 3/0464 |
| 2020/0311572 A1* | 10/2020 | Baker | .................... | G06N 3/098 |

OTHER PUBLICATIONS

Chen, "Boundary Attack++: Query-Efficient Decision-Based Adversarial Attack", 2019 (Year: 2019).*

Ans & Rousset, "Self-refreshing memory in artificial neural networks: Learning temporal sequences without catastrophic forgetting", 2004 (Year: 2004).*

PCT/EP2021/058631, Jun. 8, 2021, International Search Report and Written Opinion.

International Preliminary Report on Patentability for International Application No. PCT/EP2021/058631, mailed Oct. 13, 2022.

Alain et al., What Regularized Auto-Encoders Learn from the Data-Generating Distribution. Journal of Machine Learning Research. 2014; 15:3743-73.

French, Pseudo-recurrent connectionist networks: An approach to the 'sensitivity-stability' dilemma. Connection Science. Dec. 1, 1997;9(4):353-80.

Mccloskey et al., Catastrophic interference in connectionist networks: the sequential learning problem. The Psychology of Learning and Motivation. 1989;24:109-65.

Rifai et al., A generative process for sampling contractive auto-encoders. Proceedings of the 29th International Conference on International Conference on Machine Learning. 2012. 8 pages.

International Search Report and Written Opinion for International Application No. PCT/EP2021/058631, mailed Jun. 8, 2021.

Ans et al., Neural networks with a self-refreshing memory: knowledge transfer in sequential learning tasks without catastrophic forgetting. Connection Science. Mar. 1, 2000;12(1):1-19.

Ans et al., Self-refreshing memory in artificial neural networks: Learning temporal sequences without catastrophic forgetting. Connection Science. Jun. 1, 2004;16(2):71-99.

Chen et al., Net2net: Accelerating learning via knowledge transfer. arXiv preprint arXiv: 1511.05641. Nov. 18, 2015:1-12.

Solinas et al., Generalization of iterative sampling in autoencoders. 2020 19th IEEE International Conference on Machine Learning and Applications (ICMLA). Dec. 14, 2020:877-82. https://hal-cea.archives-ouvertes.fr/cea-02917445.

* cited by examiner

Fig. 1
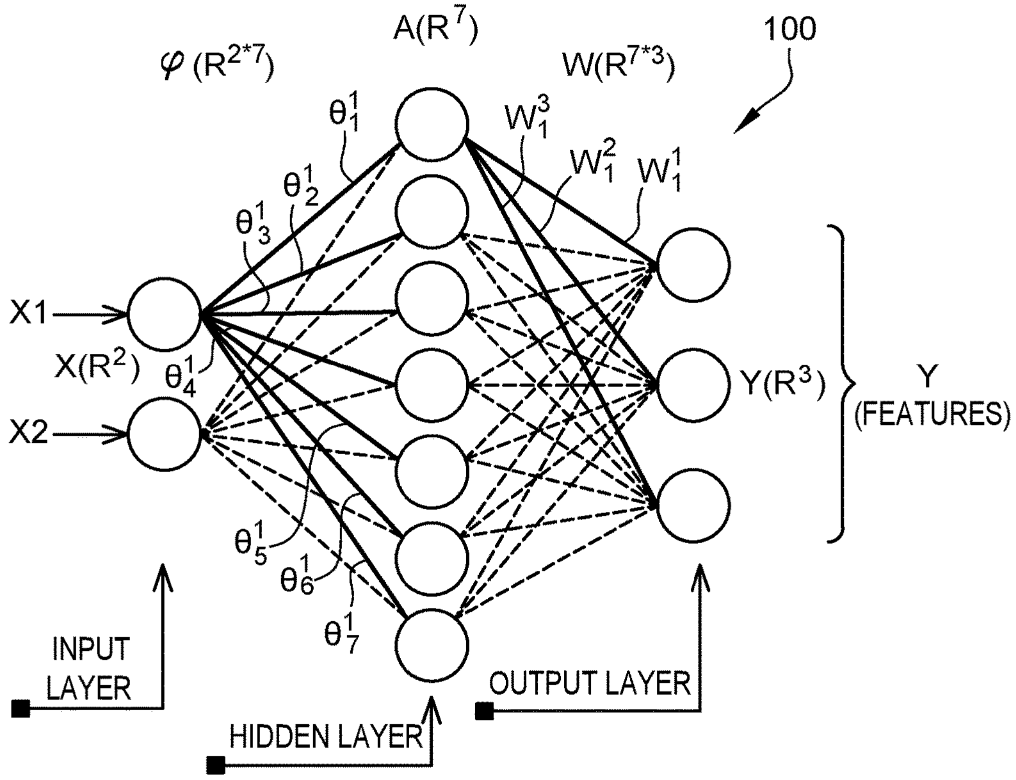
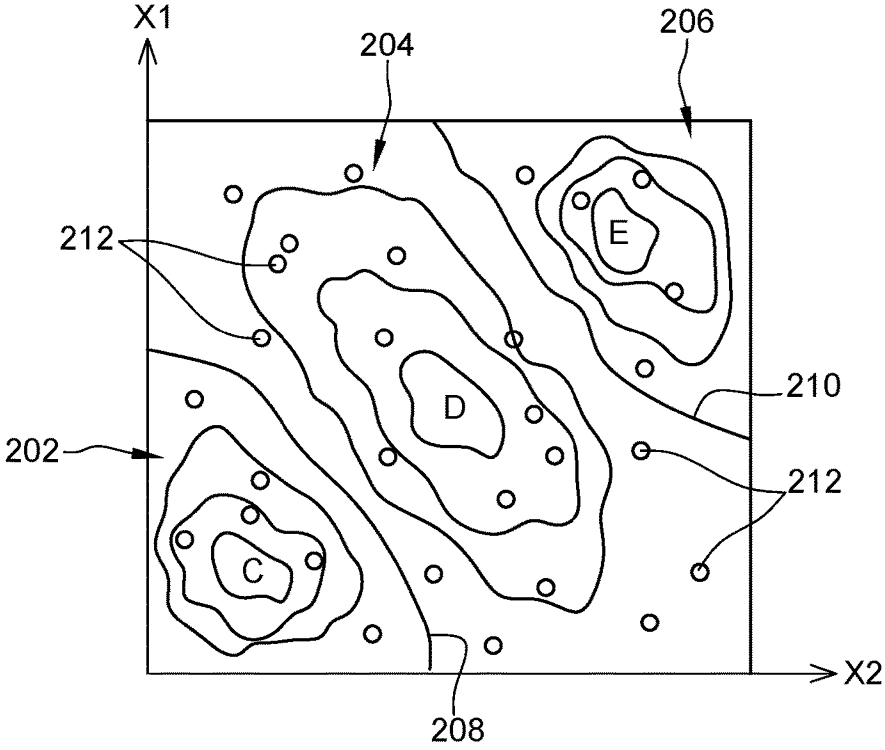
Fig. 2

Fig. 5
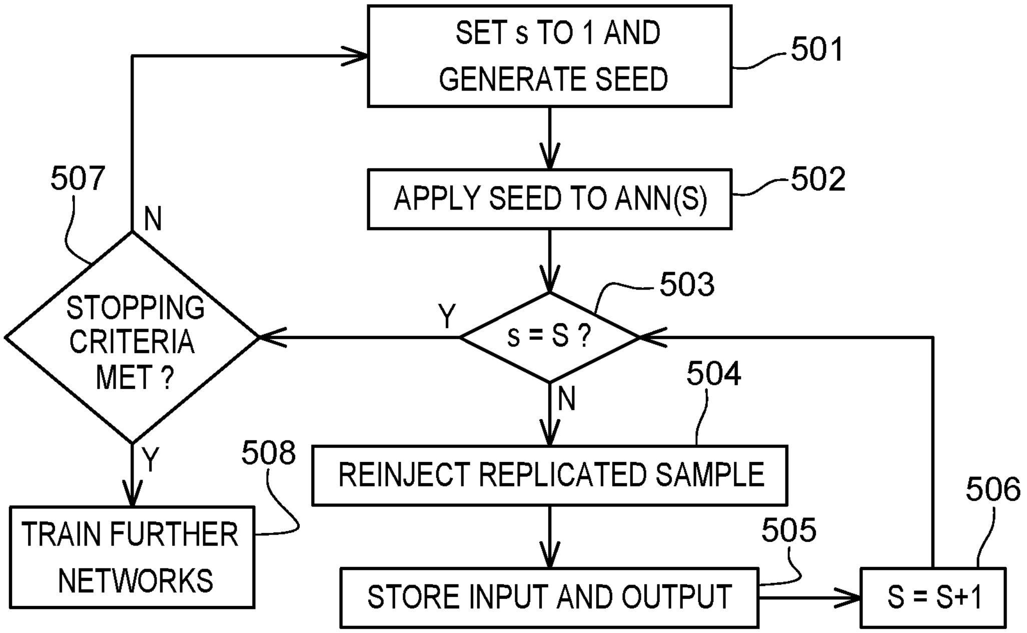
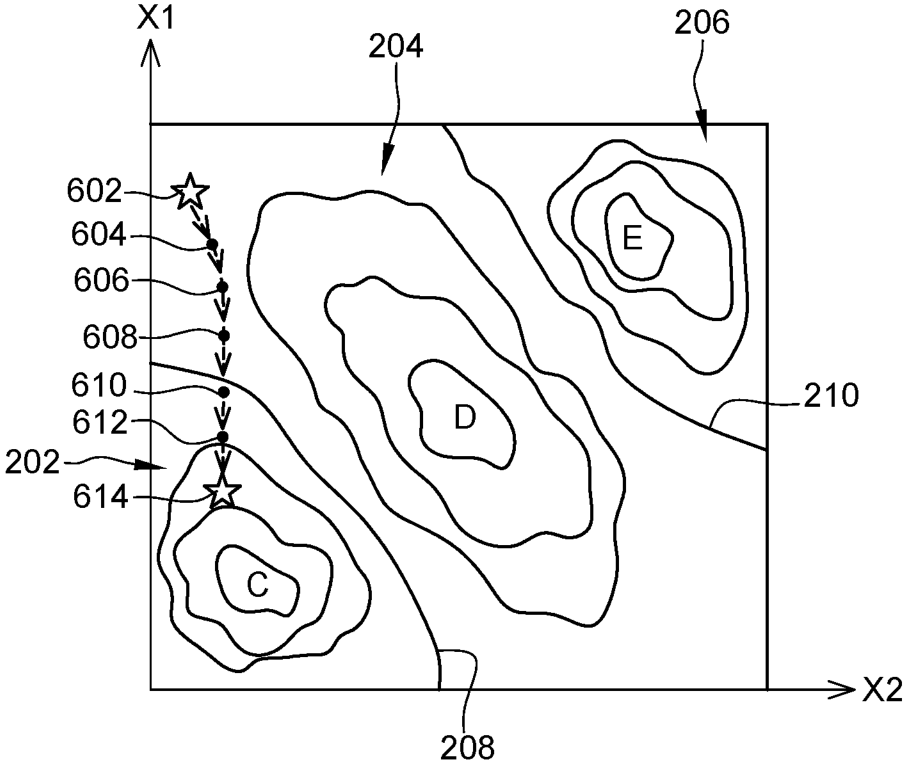
Fig. 6

Fig. 10
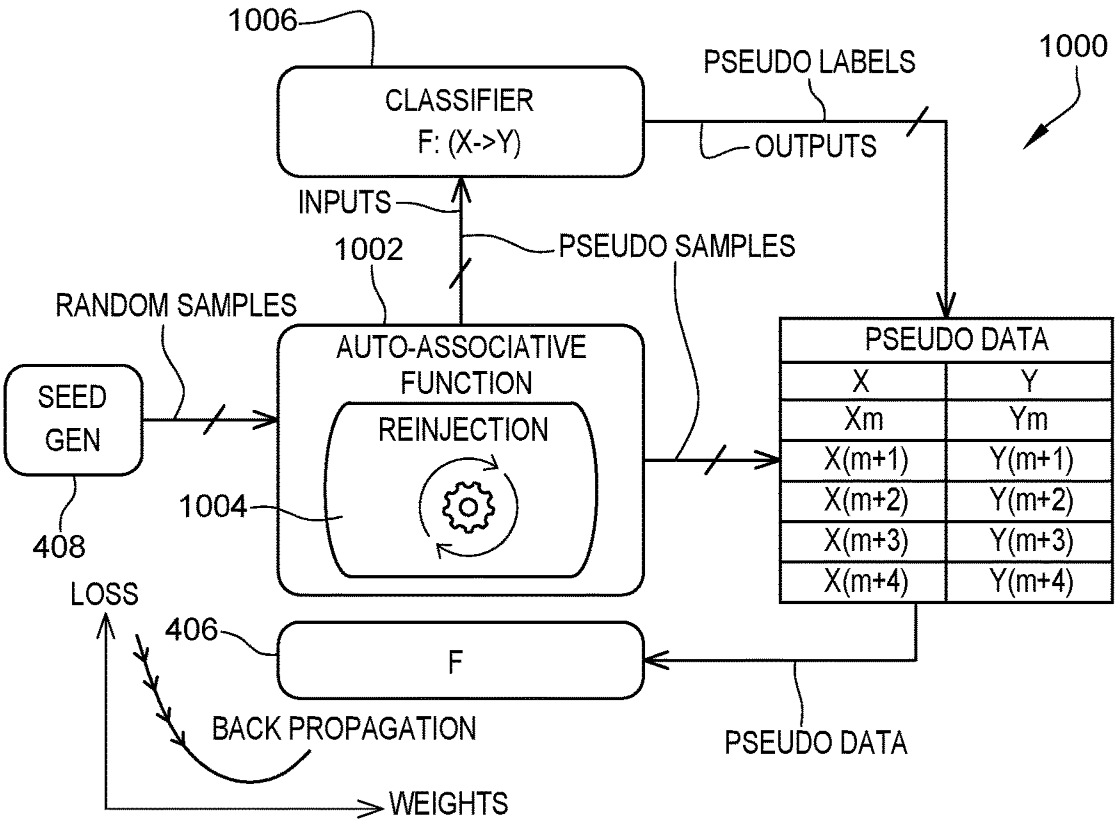
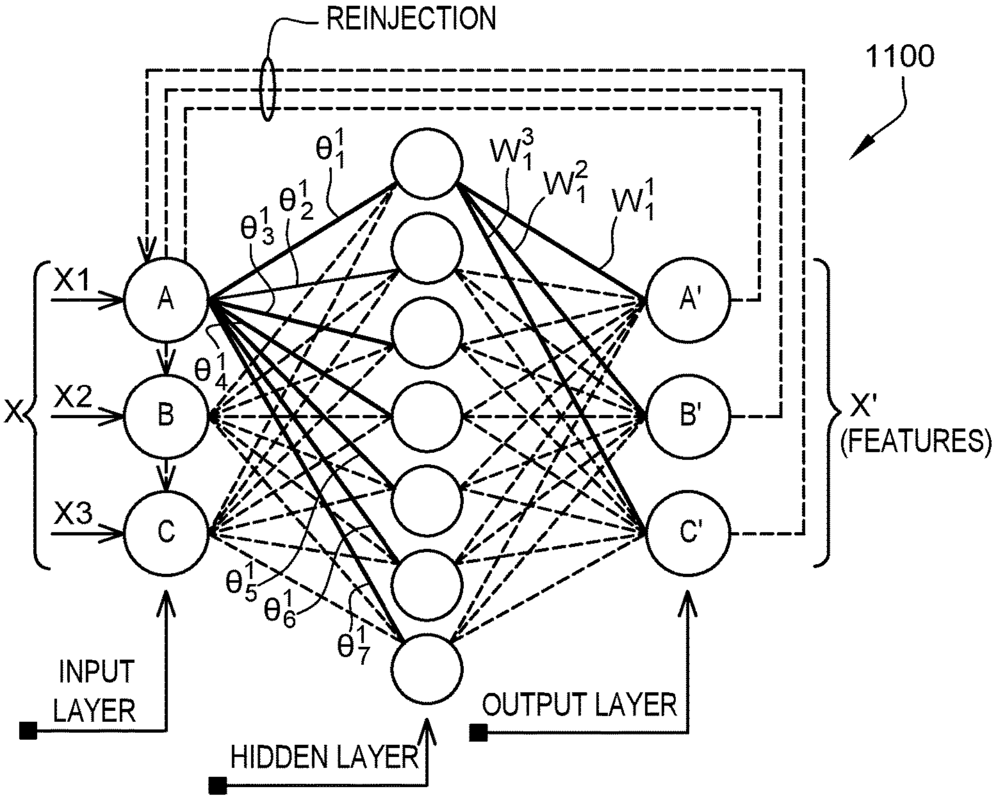
Fig. 11

DEVICE AND METHOD FOR TRANSFERRING KNOWLEDGE OF AN ARTIFICIAL NEURAL NETWORK

CROSS-REFERENCE TO RELATED APPLICATIONS

This Application is a national stage filing under 35 U.S.C. § 371 of International Patent Application Serial No. PCT/EP2021/058631, filed Apr. 1, 2021, which claims priority to French application number 2009220, filed Sep. 11, 2020 and French application number 2003326, filed Apr. 2, 2020. The contents of these applications are incorporated herein by reference in their entirety.

TECHNICAL FIELD

The present disclosure relates generally to the field of artificial neural networks, and in particular to a device and method for transferring knowledge between artificial neural networks.

BACKGROUND ART

Artificial neural networks (ANNs) are architectures that aim to mimic, to some extent, the behavior of a human brain. Such networks are generally formed of neuron circuits, and interconnections between the neuron circuits, known as synapses.

As known by those skilled in the art, ANN architectures, such as multi-layer perceptron architectures, comprise an input layer of neuron circuits, one or more hidden layers of neuron circuits, and an output layer of neuron circuits. Each of the neuron circuits in the hidden layer or layers applies an activation function, such as the sigmoid function, to inputs received from the previous layer in order to generate an output value. The inputs are weighted by parameters θ at the inputs of the neurons of the hidden layer or layers. While the activation function is generally selected by the designer, the parameters θ are found during training.

For a given problem, a function to be approximated is for example one that generates, based on inputs X, true output labels $y_t=F(x)$, where F(x) is the function that maps X to Y. The trained network $y_p=f(x; \theta)$ is trained to generate a value $y_p$ that is as close as possible to the true value $y_t$ by minimizing a loss function. The performance of a trained ANN in solving the task being learnt lies on its architecture, the number of parameters θ, and how the ANN is trained. In general, the larger and more complex the ANN is, the better its performance.

In some embodiments, it may be desirable to train more than one ANN to perform a same function. One solution could be to train each ANN using the same set of raw data samples constituting the training data. However, this would involve conserving the training data in order to permit new ANNs to be trained, which is costly in terms of hardware resources, and in some cases the original training dataset may no longer be available when it is desired to transfer the knowledge.

One solution for addressing this problem, known as transfer learning, is to copy the parameters of a trained ANN to a second untrained ANN, thereby avoiding the need to train the second ANN. Such a technical can provide good results, but relies on the architectures of the two ANNs being based on the same model, in other words the new model of the second ANN must hold the original architecture of the trained ANN in order to transfer the original function $f(x; \theta)$. Indeed, if the second ANN has a different depth from the trained ANN, be it shallower or deeper, it will not be able to handle the original parameters. Since the original architecture must remain fixed, this technique does not offer a flexible solution.

There is thus a need in the art for a solution permitting knowledge to be transferred between ANNs having different depths.

SUMMARY OF INVENTION

It is an aim of embodiments of the present invention to at least partially address one or more problems in the prior art.

According to one embodiment, there is provided a method of generating training data for transferring knowledge from a trained artificial neural network to a further artificial neural network, the method comprising: a) injecting a random sample into the trained artificial neural network, wherein the trained artificial neural network is configured to implement at least an auto-associative function for replicating input samples at one or more of its outputs; b) reinjecting a pseudo sample, generated based on the replicated sample present at the one or more outputs of the trained artificial neural network, into the trained artificial neural network in order to generate a new replicated sample at the one or more outputs; and c) repeating b) one or more times to generate a plurality of reinjected pseudo samples; wherein the training data for training the further artificial neural network comprises at least two of said reinjected pseudo samples originating from the same random sample and corresponding output values generated by the trained artificial neural network.

According to one embodiment, the trained artificial neural network, or another trained artificial neural network, is configured to implement a classification function, and wherein the corresponding output values of the training data comprise pseudo labels generated by the classification function based on the reinjected pseudo samples.

According to one embodiment, the method further comprises detecting, based on the pseudo labels, when a boundary between two pseudo label spaces is traversed between consecutive reinjections of two of the pseudo samples, wherein the at least two reinjected pseudo samples forming the training data comprise at least the two consecutively reinjected pseudo samples.

According to one embodiment, the pseudo labels are unnormalized outputs of the classification function.

According to one embodiment, the further artificial neural network is configured to implement at least an auto-associative function for replicating input samples at one or more of its outputs, and wherein the corresponding output values of the training data comprise the new replicated samples generated by the auto-associative function of the trained artificial neural network based on the reinjected pseudo samples.

According to one embodiment, the method further comprises: d) repeating a), b) and c) at least once based on new random samples in order to generate, on each repetition, at least two further reinjected pseudo samples forming the training data.

According to one embodiment, the method further comprises generating the random sample based on a normal distribution or based on a tuned uniform distribution.

According to one embodiment, generating the pseudo sample comprises injecting noise into the replicated sample present at the one or more outputs of the trained artificial neural network.

According to a further aspect, there is provided a method of transferring knowledge from a trained artificial neural network to one or more further artificial neural networks, the method comprising: generating training data using the above method; and training the further artificial neural network based on the generated training data.

According to a further aspect, there is provided a system for generating training data for transferring knowledge from a trained artificial neural network to a further artificial neural network, the system comprising a data generator configured to: a) inject a random sample into the trained artificial neural network, wherein the trained artificial neural network is configured to implement at least an auto-associative function for replicating input samples at one or more of its outputs; b) reinject a pseudo sample, generated based on the replicated sample present at the one or more outputs of the trained artificial neural network, into the trained artificial neural network in order to generate a new replicated sample at the one or more outputs; and c) repeating b) one or more times to generate a plurality of reinjected pseudo samples; wherein the data generator is further configured to generate the training data for training the further artificial neural network to comprises at least two of said reinjected pseudo samples originating from the same random sample and corresponding output values generated by the trained artificial neural network.

According to one embodiment, the system further comprises the further artificial neural network, and a training system configured to train the further artificial neural network based on the training data.

According to one embodiment, the trained artificial neural network, or another trained artificial neural network, is configured to implement a classification function, and wherein the data generator is configured to generate the training data to further comprise pseudo labels generated by the classification function based on the reinjected pseudo samples, and wherein the further artificial neural network is capable of implementing a classification function.

According to one embodiment, the further artificial neural network is configured to implement at least an auto-associative function for replicating input samples at one or more of its outputs, and wherein the training data further comprises the new replicated samples generated by the auto-associative function of the trained artificial neural network based on the reinjected pseudo samples.

According to one embodiment, the system further comprises a seed generator configured to generate the random sample based on a normal distribution or based on a tuned uniform distribution.

According to one embodiment, the data generator is configured to generate the pseudo sample by injecting noise into the replicated sample present at the one or more outputs of the trained artificial neural network.

BRIEF DESCRIPTION OF DRAWINGS

The foregoing features and advantages, as well as others, will be described in detail in the following description of specific embodiments given by way of illustration and not limitation with reference to the accompanying drawings, in which:

FIG. 1 illustrates multi-layer perceptron ANN architecture according to an example embodiment;

FIG. 2 illustrates a 2-dimensional space providing an example of a model that classifies elements into three classes, and an example of random samples in this space;

FIG. 5 is a flow diagram illustrating operations in a method of knowledge transfer according to an example embodiment of the present disclosure;

FIG. 6 illustrates a 2-dimensional space providing an example of a model that classifies elements into three classes, and an example of a trajectory of pseudo samples in this space;

FIG. 10 schematically illustrates a system for knowledge transfer according to a further example embodiment of the present disclosure;

FIG. 11 schematically illustrates an ANN architecture according to a further example embodiment of the present disclosure;

DESCRIPTION OF EMBODIMENTS

Figure 3:
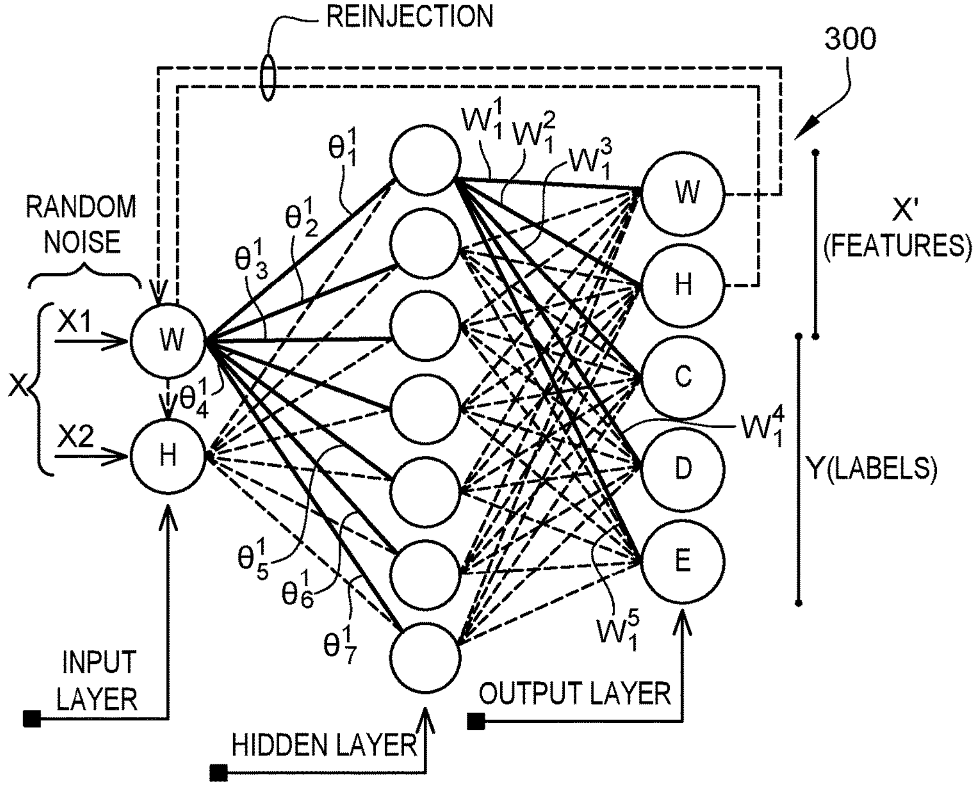
FIG. 3 schematically illustrates an ANN architecture according to an example embodiment of the present disclosure.

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail. In particular, techniques for training an artificial neural network, based for example on minimizing an objective function such as a cost function, are known to those skilled in the art, and will not be described herein in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

In the following description, the following terms will be assumed to have the following definitions:

"real input data": data samples collected and used to train an untrained ANN, this input data being designated as "real" because it is not computer-generated data, and is not therefore synthetic;

"random sample": a computer-generated synthetic sample based on random or pseudo-random values;

"training data" or "pseudo data": data that can be used to train one or more neural networks, this data for example comprising, in the embodiments of the present disclosure, synthetic data in the form of pseudo samples, and in the case of a classier, pseudo labels;

"pseudo sample": a computer-generated synthetic sample generated based on a guided data generation process or using preprocessing;

"pseudo label": a label generated by a trained neural network in response to the injection of a pseudo sample, wherein the pseudo label corresponds to the ground truth to be targeted during the training of an ANN using training data; and "auto-associative": the function of replicating inputs, like in an auto-encoder. However, the term "auto-encoder" is often associated with an ANN that is to perform some compression, for example involving a compression of the latent space meaning that the one or more hidden layers contain less neurons than the number of neurons of the input space. In other words, the input space is projected into a smaller space. The term "auto-associative" is used herein to designate a replication function similar to that of an auto-encoder, but an auto-associative function is more general in that it may or may not involve compression.

FIG. 1 illustrates a multi-layer perceptron ANN architecture 100 according to an example embodiment.

The ANN architecture 100 according to the example of FIG. 1 comprises three layers, in particular an input layer (INPUT LAYER), a hidden layer (HIDDEN LAYER), and an output layer (OUTPUT LAYER). In alternative embodiments, there could be more than one hidden layer. Each layer for example comprises a number of neurons. For example, the ANN architecture 100 defines a model in a 2-dimensional space, and there are thus two visible neurons in the input layer receiving the corresponding values X1 and X2 of an input X. The model has a hidden layer with seven output hidden neurons, and thus corresponds to a matrix of dimensions $\mathbb{R}^{2*7}$. The ANN architecture 100 of FIG. 1 corresponds to a classifying network, and the number of neurons in the output layer thus corresponds to the number of classes, the example of FIG. 1 having three classes.

The mapping $y=f(x)$ applied by the ANN architecture 100 is a functions aggregation, comprising an associative function $g_n$ within each layer, these functions being connected in a chain to map $y=f(x)=g_1(g_2(\ldots(g_n(x))\ldots))$. There are just two such functions in the simple example of FIG. 1, corresponding to those of the hidden layer and the output layer.

Each neuron of the hidden layer receives the signal from each input neuron, a corresponding parameter $$\theta_j^i$$

being applied to each neuron j of the hidden layer from each input neuron i of the input layer. FIG. 1 illustrates the parameters $$\theta_1^1$$

to $$\theta_7^1$$

applied to the outputs of a first of the input neurons to each of the seven hidden neurons.

The goal of the neural model defined by the architecture 100 is to approximate some function $F:X\rightarrow Y$ through the set of parameters $\theta$. The model corresponds to a mapping $y=f(x;\theta)$, the parameters $\theta$ for example being modified during training based on an objective function, such as a cost function. In some embodiments, the mapping function is based on a non-linear projection $\varphi$, generally called the activation function, such that the mapping function $f$ can be defined as $y_p=f(x;\theta,w)=\varphi(x;\theta)^T w$, where $\theta$ are the parameters of $\varphi$, and w is a vector value. In general, a same function is used for all layers, but it is also possible to use a different function per layer. In some cases, a linear activation function $\varphi$ could also be used, the choice between a linear and non-linear function depending on the particular model and on the training data.

The vector value w is for example valued by the non-linear function $\varphi$ as the aggregation example. For example, the vector value w is formed of weights W, and each neuron k of the output layer receives the outputs from each neuron j of the hidden layer weighted by a corresponding one of the weights $$W_j^k.$$

The vector value can for example be viewed as another hidden layer with a non-linear activation function $\varphi$ and its parameters W. FIG. 1 represents the weights $$W_1^1$$

to $$W_1^3$$

applied between the output of a top neuron of the hidden layer and each of the three neurons of the output layer.

The non-linear projection $\varphi$ is for example manually selected, for example as a sigmoid function. The parameters $\theta$ of the activation function are, however, learnt by training, for example based on the gradient descent rule. Other features of the ANN architecture, such as the depth of the model, the choice of optimizer for the gradient descent and the cost function, are also for example selected manually.

There are two procedures that can be applied to an ANN such as the ANN 100 of FIG. 1, one being a training or backward propagation procedure in order to learn the parameters θ, and the other being an inference or feedforward propagation procedure, during which input values X flow through the function, and are multiplied by the intermediate computations defining the mapping function $f$, in order to generate an output y.

FIG. 2 illustrates a 2-dimensional space providing an example of a model that classifies elements into three classes. In the example of FIG. 2, an artificial neural network, such as the ANN 100 of FIG. 1, is trained to map input samples defined as points represented by pairs of input values X1 and X2 into one of three classes C, D and E.

As an example, $X \in \mathbb{R}^2$, where X1 is a weight feature, X2 is a corresponding height feature, and the function $y_p = f(X; \theta)$ maps the height and weight samples into a classification of cat (C), dog (D) or elephant (E). In other words, the ANN is trained to define a non-linear boundary between cats, dogs and elephants based on a weight feature and a height feature of an animal, each sample described by these features falling in one of the three classes.

The space defined by the value X1 in the y-axis and X2 in the x-axis is divided into three regions 202, 204 and 206 corresponding respectively to the classes C, D and E. In the region 202, any sample has a higher probability of falling in the class C than in either of the other classes D and E, and similarly for the regions 204 and 206. A boundary 208 between the C and D classes, and a boundary 210 between the D and E classes, represent the uncertainty of the model, that is to say that, along these boundaries, samples have equal probabilities of belonging to each of the two classes separated by the boundary. Contours in FIG. 2 represent the sample distributions within the area associated with each class, the central zones labelled C, D and E corresponding to the highest density of samples. An outer contour in each region 202, 204, 206 indicates the limit of the samples, the region outside the outer contour in each region 202, 204, 206 for example corresponding to out-of-set samples.

As explained in the background section above, in some embodiments, it may be desirable to train more than one ANN to perform a same function. One solution could be to train each ANN using the same set of raw data samples constituting the training data. However, this would involve conserving the training data in order to permit new ANNs to be trained, which is costly in terms of hardware resources, and in some cases the original training dataset may no longer be available when it is desired to transfer the knowledge.

This problem could be avoided using transfer learning, but as also explained above, transferring learnt parameters from a trained ANN to a second ANN is only applicable if the architectures of the two ANNs are based on the same model, in other words the new model of the second ANN holds the original architecture of the trained ANN in order to transfer the original function $f(x; \theta)$. Indeed, if the second ANN has a different depth from the trained ANN, be it shallower or deeper, it will not be able to handle the original parameters. Since the original architecture must remain fixed, this technique does not offer a flexible solution.

There are often technical advantages in permitting the ANN architecture to be varied. For example, in some cases, a relatively large ANN is used for training, but it may be desired to then implement the learned function using a smaller architecture, that is more compact in size and/or that has lower power consumption. Conversely, it may be desired to combine the functions learned by several relatively small ANNs to a larger, more complex and more powerful ANN.

Furthermore, in some cases, there are technical problems due to privacy of the data sets. For example, it may be desired to train an ANN using first and second data sets of confidential data, such as patients' medical data, financial data, or other personal data. In order to respect the data privacy, each data sets should not be communicated outside of its secure environment, e.g. medical practice, hospital, financial institution, etc. Therefore, training a single ANN based on the knowledge from each of the data sets poses a technical challenge because, due to the privacy constraints, the data sets should not be communicated to a common ANN for training. Thus, training an ANN using both data sets simultaneously is not possible. Furthermore, training first and second ANNs based on the first and second data sets respectively, and then transferring the learned parameters to a common ANN would not work as it is not possible to combine parameters from more than one trained ANN.

Another solution that has the advantage of not requiring the storage of the raw training data is to use a trained ANN to generate artificial training data that characterizes the function $f$ of the original model, and thus permits new models having different depths to the original model to learn an approximation of the function $f$. Such a technique is referred to herein as knowledge transfer.

FIG. 2 represents a simplistic approach to generating this training data, which involves generating random input values, corresponding to random samples in the sample space. Examples of such random samples are represented by small circles 212 in FIG. 2, only some of which are labelled for ease of illustration. By applying these random samples to the trained classifier ANN, and storing the resulting classifications, training data can be generated. Indeed, each set of a random sample and a corresponding label forms a training pair, and these training sets approximately characterize and represent the classification function X->Y, or y=F(X), of the trained ANN. The training pairs can therefore be used to train a new ANN. For example, such training data can be used to capture, to some extent, the decision boundaries 208, 210 of the original model. However, a limitation of such a method is that, unless the training set is very large, interesting areas of the input space may be omitted from the training set. This is particularly the case when the input space has relatively high dimensions. This means that the larger the number of dimensions that are to be sampled, the lower the probability that an area is preserved. There is thus a technical problem in generating training data for training untrained ANNs that permit the original model to be effectively captured.

FIG. 3 schematically illustrates an ANN architecture 300 according to an example embodiment of the present disclosure. The ANN 300 of FIG. 3 is similar to the ANN 100 of FIG. 1, but additionally comprises an auto-associative portion capable of replicating the input data using neurons of the output layer. Thus, this model performs an embedding from $\mathbb{R}^n \rightarrow \mathbb{R}^n \times \{1, 2, \ldots c\}$, with n the features, and c the classes. Like in the example of FIG. 1, in the ANN 300 of FIG. 3, each input sample has two values, corresponding to a 2-dimensional input space, and there are thus also two corresponding additional output neurons (FEATURES) for generating an output pseudo sample (X') replicating the input sample. For example, like in the example of FIGS. 1 and 2, the input values of each sample represent a weight (W) and a height (H), and the ANN 300 classifies these samples as being either cats (C), dogs (D) or elephants (E), corresponding to the label (LABELS) forming the output value Y.

The auto-associative portion of the ANN 300 behaves in a similar manner to an auto-encoder. Auto-encoders are a type of ANN known to those skilled in the art that, rather than being trained to perform classification, are trained to replicate their inputs at their outputs. As indicated above, the term "auto-associative" is used herein to designate a functionality similar to that of an auto-encoder, except that the latent space is not necessarily compressed. Furthermore, like for the training of an auto-encoder, the training of the auto-associative part of the ANN may be performed with certain constraints in order to avoid the ANN converging rapidly towards the identity function, as well known by those skilled in the art.

The ANN 300 is for example implemented by dedicated hardware, such as by an ASIC (application specific integrated circuit), or by a software emulation executed on a computing device, or by a combination of dedicated hardware and software.

In the example of FIG. 3, the network is common for the auto-associative portion and the classifying portion, except in the output layer. Furthermore, each of the output neurons W and H of the auto-associative portion receives outputs from each of the neurons of the hidden layer. However, in alternative embodiments, there could be a lower amount of overlap, or no overlap at all, between the auto-associative and classifying portions of the ANN 300. Indeed, as described in more detail below, in some embodiments, the auto-associative and hetero-associative functions could be implemented by separate neural networks. In some embodiments, in addition to the common neurons in the input layer, there is at least one other common neuron in the hidden layers between the auto-associative and classifying portions of the ANN 300. A common neuron implies that this neuron supplies its output directly, or indirectly, i.e. via one or more neurons of other layers, to at least one of the output neurons of the auto-associative portion and at least one of the output neurons of the classifying portion.

As illustrated in FIG. 3, a reinjection is performed of the auto-associative outputs back to the inputs of the ANN. Such a reinjection is performed in order to generate training data, and as will be described in more detail below, the reinjection is for example performed by a data generator that is coupled to the ANN. Thus, the auto-associative portion of the ANN model is used as a recursive function, in that its outputs are used as its inputs. This results in a trajectory of the outputs, wherein, after each reinjection, the generated samples become closer to the real raw samples in interesting areas of the input space. Advantageously, according to the embodiments described herein, for each seed injected into the ANN, at least two points on this trajectory are for example used to form training data for training another ANN.

The generation of training data for knowledge transfer based on the ANN 300 will now be described in more detail with reference to FIGS. 4 to 8.

Figure 4:
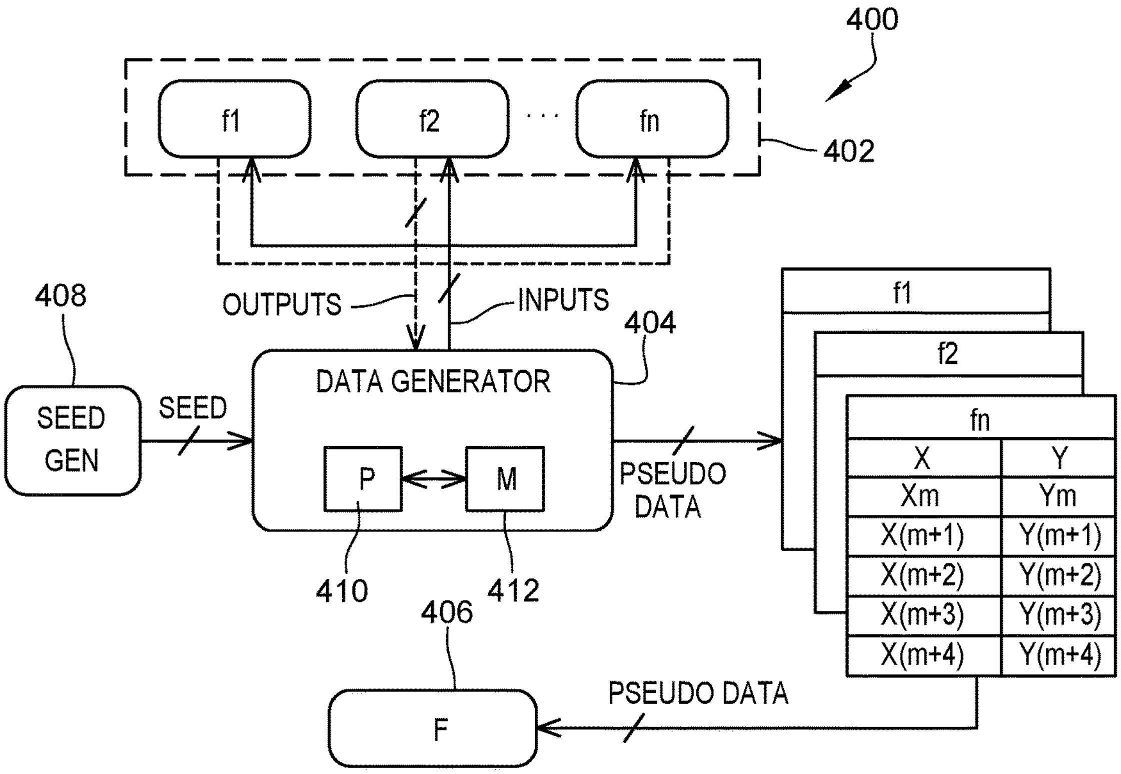
FIG. 4 schematically illustrates a system for knowledge transfer according to an example embodiment of the present disclosure.

FIG. 4 schematically illustrates a system 400 for knowledge transfer according to an example embodiment of the present disclosure.

The system 400 comprises one or more artificial neural networks 402, each for example corresponding to an ANN similar to that of FIG. 3, and comprising, in particular, at least an auto-associative portion. In the example of FIG. 4, the functions applied by the ANNs are labelled f1 to fn.

In one example, there is a single trained ANN 402, and it is desired to generate training data in order to transfer the trained knowledge of the single ANN 402 to at least one further ANN having a different model from the trained ANN 402.

In another example, there are a plurality of trained ANNs 402, and it is desired to transfer the knowledge of the plurality of trained ANNs 402 to at least one further ANN, wherein each further ANN is trained to implement all of the functions of the plurality of trained ANNs 402. In other words, the knowledge may be federated from multiple ANNs, such as multiple ANN classifiers, to a single ANN, such as a single ANN classifier.

In yet a further example, there are a plurality of trained ANN 402, and it is desired to transfer the knowledge of the plurality of trained ANNs 402 to a plurality of further ANNs.

The system 400 also comprises a data generator (DATA GENERATOR) 404 configured to make use of auto-associative functions of one or more of the trained ANNs 402 in order to generate pseudo data (PSEUDO DATA) for training one or more further ANNs 406.

The data generator 404 for example receives a seed value (SEED) generated by a seed generator (SEED GEN) 408. The seed generator 408 is for example implemented by a pseudo-random generator or the like, and generates random values based on a given random distribution for forming each seed value, as will be described in more detail below.

Alternatively, the seed generator 608 could generate the seed values based on real data samples, which are for example selected randomly. For example, the seed generator 608 comprises a memory storing a limited number of real data samples, which are for example selected randomly from the real data set. This memory can therefore be relatively small. Each seed value is for example drawn from among these real data samples, with or without the addition of noise. For example, in the case that noise is added, the amount of noise is chosen such that the noise portion represents between 1% and 30% of magnitude of the seed value, and in some cases between 5% and 20% of magnitude of the seed value.

The data generator 404 for example generates input values (INPUTS) provided to the one or more ANNs 402, receives output values (OUTPUTS) from the one or more ANNs 402, and generates training data (PSEUDO DATA) comprising the pseudo samples and resulting pseudo labels, as will be described in more detail below. The pseudo data is for example used on the fly to train the one or more further ANNs 406, or it is stored to one or more files, which are for example stored by a memory, such as a non-transitory memory device. For example, the pseudo data is stored to a single file, or, in the case that there is a plurality of different further ANNs 406 to be trained, the pseudo data is for example stored to a plurality of files associated with the functions f1 to fn implemented by the ANNs.

In some embodiments, the functionalities of the data generator 404 are implemented by a processing device (P) 410, which for example executes software instructions stored by a memory (M) 412. Alternatively, the data generator 404 could be implemented by dedicated hardware, such as by an ASIC.

The one or more further ANNs 406 to be trained may correspond to one or more classic architectures that are configured to only perform classification, e.g. of the type described in relation with FIG. 1 above. Alternatively, one or more of the further ANNs 406 to be trained could have auto-associative or auto-encoding portions in addition to the classification function, these ANNs for example being of the type represented in FIG. 3. It would also be possible for one or more of the further ANNs to be trained to have only auto-associative functionality, as will be described in more detail below.

FIG. 5 is a flow diagram illustrating operations in a method of knowledge transfer according to an example embodiment of the present disclosure. This method is for example implemented by the system 400 of FIG. 4.

In an operation 501, a variable s is initialized, for example at 1, and a first seed value is generated by the seed generator 408.

In an operation 502, the first seed value is for example applied by the data generator 404 as an input to the one or more ANNs 402. Thus, each of the one or more ANNs 402 propagates the seed X0 through its layers and generates, at its output layer, labels Y0 corresponding to the classification of the seed, and features X0' corresponding to the seed modified based on the trained auto-associative portion of the ANN.

For the purpose of classification, it is generally desired that the generated pseudo labels of an ANN are normalized, for example using one hot encoding, to indicate the determined class. However, in reality, the ANN will generate unnormalized outputs that represent the relative probability of the input sample to fall within each class, in other words the relative probability to assign a probability of all the classes, instead of a discrete class. Advantageously, the training data comprises pseudo labels in the form of the unnormalized output data, thereby providing greater information for the training of the further ANNs, and in particular including the information that is delivered for all of the classes, and not just the class that is selected. For example, logits or distillation can be used to train a model using pseudo labels, as known by those skilled in the art. This for example uses binary crossentropy. Distillation is for example described in more detail in the publication by Geoffrey Hinton et al. entitled "Distilling the Knowledge in a Neural Network" (arXiv.1503.02531v1, 9 Mar. 2015), and in the US patent application published as US2015/0356461, the contents of these publications being hereby incorporated by reference. For the case of synthetic samples that may not belong sharply to a particular class, a logit/distillation method is for example used as known by those skilled in the art, this method for example being used to assign probability of all classes instead of a discrete class. The relative probabilities indicate how a model tends to generalize and helps to transfer the generalization ability of a trained model to a new model.

In an operation 503, it is then determined whether the variable s has reached a value S, which is for example a stopping condition for the number of reinjections based on each seed. In one example, the value S is equal to 6, but more generally it could be equal to between 3 and 20, and for example between 4 and 10, depending on the size of the input space, and depending on the quality of the trained auto-association. Indeed, when the auto-association is well trained, in other words such that there is a relatively low error between inputs in the replications of the network, relatively few reinjections, e.g. less than 10, can for example be used to provide a good sampling of the input space. Otherwise, a relatively high number of reinjections, for example between 10 and 20, may be used in order to find the regions of interest.

In alternative embodiments, rather than the stopping condition in operation 503 being a fixed number of reinjections, it could instead be based on the variation between the replications, such as based on a measure of the Euclidean distance, or any other type of distance, between the last two projections. For example, if the Euclidean distance has fallen below a given threshold, the stopping condition is met. Indeed, the closer the replications become to each other, the closer the pseudo samples are becoming to the underlying true sample distribution.

Initially the variable s is set to 1, and thus is not equal to S. Therefore, the next operation is an operation 504, in which the pseudo sample at the output of each of the one or more ANNs 402 is reinjected into the corresponding ANN. Then, in an operation 505, the pseudo sample reinjected into each of the one or more ANNs 402 in operation 504, and the corresponding output pseudo label from each of the one or more ANNs 402, are for example stored to form training data, as will now be described in more detail with reference to FIG. 6.

FIG. 6 illustrates a 2-dimensional space providing an example of a model that classifies elements into three classes, and an example of pseudo samples in this space that follow a pseudo sample trajectory from a random seed through to a final pseudo sample.

The example of FIG. 6 is based on the same classes C, D and E, and the same class-boundaries 208, 210, as the example of FIG. 2. An example of the seed is shown by a star 602 in FIG. 6, and a trajectory of pseudo samples 604, 606, 608, 610, 612 and 614 generated starting from this seed are also shown. Each of these pseudo samples for example results from a reinjection of the previous pseudo sample. After a certain number of reinjections, equal to six reinjections in the example of FIG. 6, reinjecting is for example stopped with a final pseudo sample represented by a star 614 in FIG. 6. As represented by the operation 505, input and output values corresponding to each point on the trajectory are for example stored to form the training data. Alternatively, only a subset of the points are used to form the training data. For example, at least two points on the trajectory are used.

Given that the auto-associative portion of the one or more ANNs 402 has been trained to replicate real samples at its output, these ANNs have been trained based on the distribution of these real samples, as represented by the contours in FIGS. 2 and 6. Thus, when a random sample is provided to these ANNs, they will generate outputs biased towards the distribution of the real samples. This explains the jump in the generated pseudo samples following each reinjection. The present inventors have shown that this is a property of any auto-associative model. Indeed, in theory, an auto-associative model does not precisely replicate when faced with random or pseudo samples because it was not trained to replicate random noise by its learning distribution. The capacity to replicate any input implies that the auto-associative model has learnt the identity function. There are many known ways to prevent such a model from learning the identity function, but in any case, in general, a model will not naturally learn the identity function.

With reference again to FIG. 5, in an operation 506, the variable s is then incremented, and then the method returns to operation 503. This loop is repeated until, in operation 503, the variable s is equal to the limit S. Then, the next operation is an operation 507.

In the operation 507, it is determined whether a further stopping criteria has been met. For example, this further stopping criteria could be based on whether an overall number of pseudo samples have been generated, the method for example ending when the number of pseudo samples in considered high enough to enable the training of one or more further ANN networks. This may depend for example on the accuracy of the trained model.

If, in operation 507, the stopping criteria has not been met, the method returns to the operation 501, such that a new seed is generated, and a new set of pseudo samples is generated for this new seed.

When, in operation 507, the stopping criteria has been met, in an operation 508, the one or more further ANNs 406 are for example trained based on the generated training data. Indeed, the gathered pseudo data contains the model of the internal function $f$, and is for example stored as a single file that characterizes the trained model. One or more further ANNs are then able to learn the model using the training data of the pseudo dataset using known deep learning tools that are well known to those skilled in the art.

Alternatively, rather than generating a file containing all of the generated training data, training of the one or more further ANNs 406 could be performed progressively during the training data generation. In other words, training is performed at least partially in parallel with the pseudo sample generation, which for example would avoid the need to store all of the pseudo samples until the end of the generation of the training data.

It will be noted that, in the example of FIG. 5, the first pseudo sample to be stored is for example the one resulting from the first reinjection. Thus, the seed itself is not used as the input value of a pseudo sample. Indeed, raw random samples are not considered to efficiently characterize the function $f$ that is to be transferred.

Furthermore, as indicated above, it is also possible to select only some of the points on the trajectory of the pseudo samples to form part of the training data. For example, in some embodiments, points are selected that lie close to a class boundary. For example, with reference to FIG. 6, in the case of the trajectory from 602 to 614, at least the points 608 and 610 are for example chosen to form part of the training data, as these points are particularly relevant to the definition of the boundary 208. The operation 505 of FIG. 5 may therefore involve detecting whether the pseudo label generated by the reinjected sample in operation 504 is different from the pseudo label generated by the immediately preceding reinjected sample, and if so, these two consecutive pseudo samples are for example selected to form part of the training data.

Figure 7:
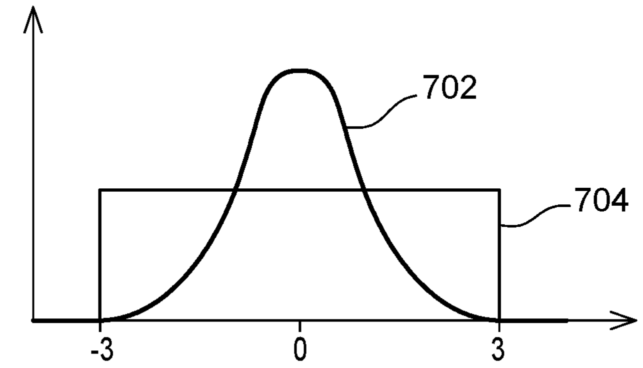
FIG. 7 is a graph illustrating examples of random distributions of random samples according to an example embodiment of the present disclosure.

FIG. 7 is a graph illustrating examples of random distributions of random samples generated by the seed generator 408 of FIG. 4 according to an example embodiment of the present disclosure.

A curve 702 represents one example in which the distribution is a Gaussian distribution that has the shape $X\sim\mathcal{N}(\mu=0, \sigma^2=I)$, although more generally any normal distribution could be used.

A curve 704 represents another example in which the distribution is a tuned uniform distribution that has the shape $X\sim U(-3,3)$, although more generally a tuned uniform distribution with a shape $X\sim U(-A, A)$ could be used, for $A\geq 1$.

Whatever the chosen random distribution, the same distribution is for example used to independently generate all of the seeds that will be used as the starting point for the trajectories of pseudo samples. As many random values as neurons in the input layer are for example sampled from the selection distribution in order to generate each input vector. This input vector is thus the same length as the model input layer, and belongs to the input space of the true samples.

Figure 8:
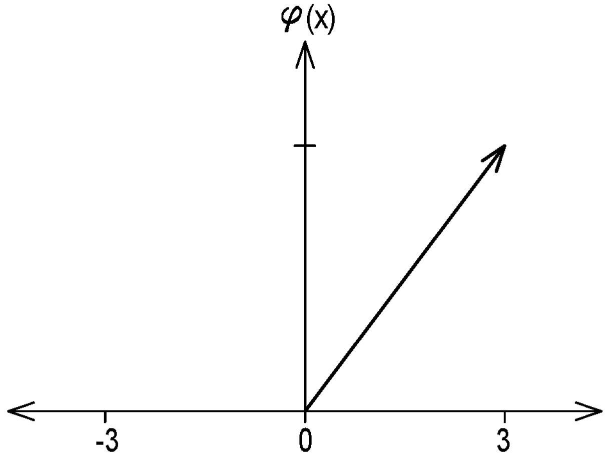
FIG. 8 is a graph illustrating an example of an activation function according to an example embodiment of the present disclosure.

FIG. 8 is a graph illustrating an example of an activation function $\varphi(x)$ of the ANN according to an example embodiment of the present disclosure. As illustrated, in some embodiments the function provides non-zero outputs only in response to non-zero inputs, implying that randomly generated negative values will be filtered by the network. Indeed, the auto-associative model will proximate any point to the learnt distribution no matter the starting point or its activation function.

In some embodiments, rather than reinjecting the auto-associative output values of the ANN as the subsequent input sample of the ANN, the output values are first modified, as will now be described in more detail with reference to FIG. 9.

Figure 9:
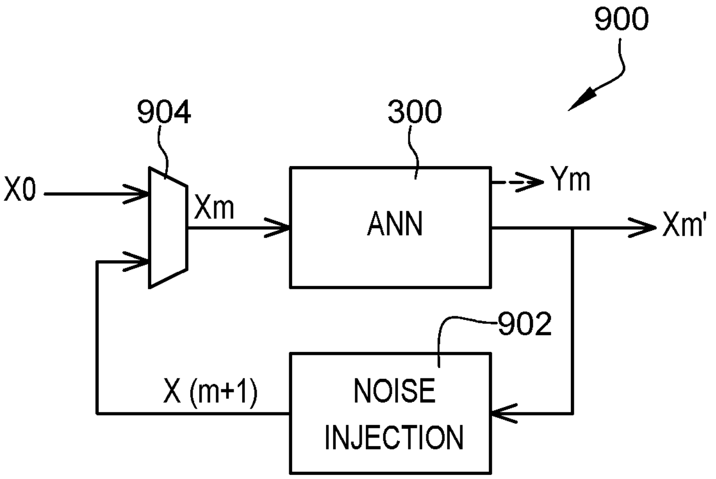
FIG. 9 schematically illustrates a sample generation circuit according to an example embodiment of the present disclosure.

FIG. 9 schematically illustrates a sample generation circuit 900 according to an example embodiment of the present disclosure. This circuit 900 is for example partly implemented by the data generator 404 of FIG. 4, and partly by the ANN 300 forming one of the ANNs 402 of FIG. 4.

The data generator 404 feeds input samples Xm to the ANN 300. The classifying portion of the ANN 300 thus generates corresponding pseudo labels Ym, and the auto-associative portion thus generates corresponding pseudo samples Xm'. The pseudo samples Xm' are provided to a noise injection module (NOISE INJECTION) 902, which for example adds a certain degree of random noise to the pseudo sample in order to generate the next pseudo sample X(m+1) to be fed to the ANN 300. For example, in some embodiments, the random noise is selected from a Gaussian distribution, such as from Gaussian $\mathcal{N}(0, I)$, and is for example pondered by a coefficient Z. For example, the coefficient Z is chosen such that, after injection, the noise portion represents between 1% and 30% of magnitude of the pseudo sample, and in some cases between 5% and 20% of magnitude of the pseudo sample.

For example, a multiplexer 904 receives at one of its inputs an initial random sample X0, and at the other of its inputs the pseudo samples X(m+1). The multiplexer for example selects the initial sample on a first iteration corresponding to operation 502 of FIG. 5, and selects the sample X(m+1) on subsequent iterations, corresponding to the operations 504 of FIG. 5, until the number S of reinjections has occurred.

While in FIG. 4 the one or more ANNs 402 each comprise an integrated auto-associative function along with the classification function, in alternative embodiments, these functions may be implemented by separate ANNs, as will now be described in more detail with reference to FIG. 10.

FIG. 10 schematically illustrates a system 1000 for knowledge transfer according to a further example embodiment of the present disclosure. Features in FIG. 10 that are common with features of FIG. 4 have been labelled with like reference numerals, and will not be described again in detail.

In the embodiment of FIG. 10, the functions of the data generator 404 of FIG. 4 are distributed between an ANN having an auto-associative function (AUTO-ASSOCIATIVE FUNCTION) 1002, which may correspond to an auto-encoder, and for example includes a reinjection circuit (REINJECTION) 1004, and a classifier (CLASSIFIER) 1006.

Operation of the system 1000 of FIG. 10 is for example the same as that described in relation with the flow diagram of FIG. 5.

The ANN 1002 is for example configured to replicate at its outputs a random sample that is provided by the seed generator (SEED GEN) 408. The reinjection circuit 1004 is then for example configured to reinject the replicated inputs present at the outputs of the ANN 1002 to the inputs of the ANN 1002, for example after noise injection as described in relation with FIG. 9. Furthermore, each replicated input generated at the output of the ANN 1002 forms a pseudo sample, which is provided to the classifier 1006, and to a memory storing the pseudo data in the form of a file.

The classifier 1006 is configured to perform inference on the pseudo samples, and to generate corresponding pseudo labels (PSEUDO LABELS), which are for example each stored as part of the pseudo data in association with the corresponding pseudo sample.

As described in relation with FIG. 4, the generated training data is for example used to train one or more further ANNs 406.

While in the embodiments described above a classification function is present in the ANN, in alternative embodiments, the ANN could have only the auto-associative function, without performing classification, as will now be described in more detail with reference to FIG. 11.

FIG. 11 schematically illustrates an ANN architecture 1100 according to a further example embodiment of the present disclosure. The architecture 1100 is similar to the ANN architecture 300, and like features are labelled with like reference numerals and will not be described again in detail. The ANN 1100 comprises an input layer of neurons (INPUT LAYER), and output layer of neurons (OUTPUT LAYER), and a single hidden layer of neurons (HIDDEN LAYER), although in alternative embodiments there could be more than one hidden layer. However, the ANN 1100 for example has only an auto-associative function, and thus does not contain any classification function. In the example of FIG. 11, the ANN 1100 has three input neurons corresponding to input channels A, B and C, and thus the output layer generates three corresponding output channels A', B' and C', which are for example reinjected directly to the input layer on each iteration, or random noise could be added, like in the example of FIG. 9.

Figure 12A:
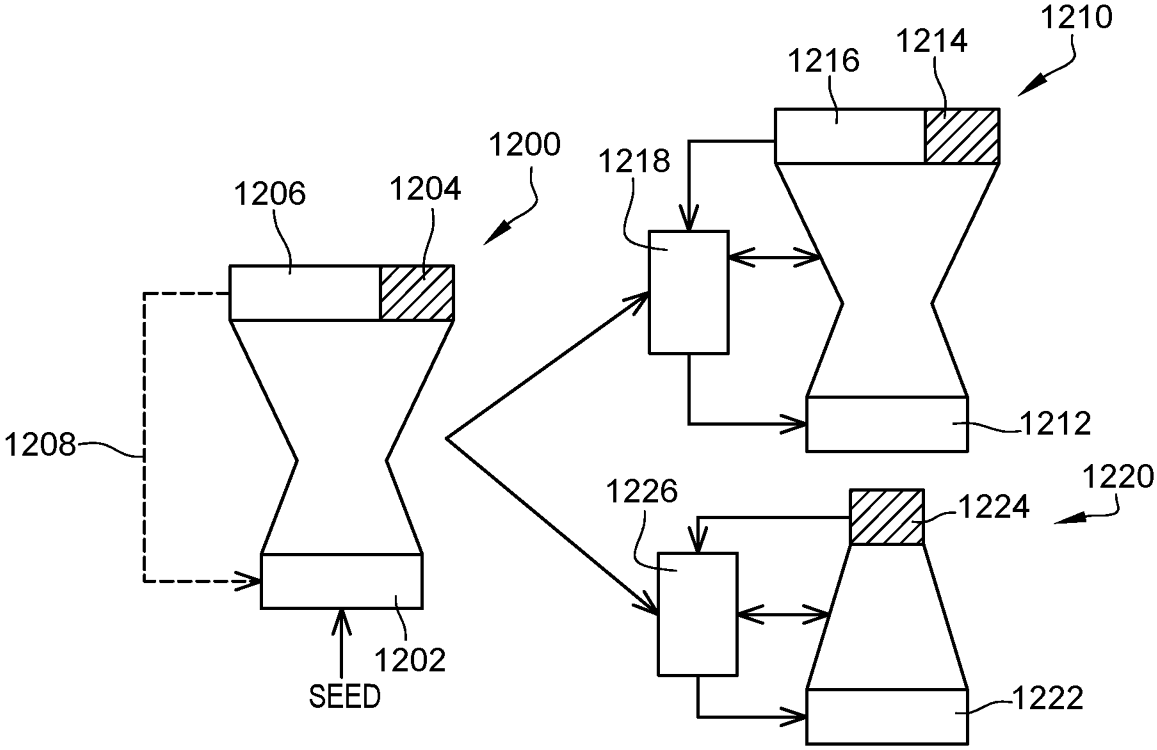
FIG. 12A schematically illustrates a system for knowledge transfer according to a further example embodiment of the present disclosure.

FIG. 12A schematically illustrates a system for knowledge transfer according to a further example embodiment of the present disclosure. In the example of FIG. 12A, a trained ANN 1200 is of the type of the ANN 300 of FIG. 3, comprising both auto-associative and hetero-associative portions. The ANN 1200 receives, at an input layer 1202, a seed (SEED), and generates at its output layer pseudo labels 1204 from its hetero-associative portion, and pseudo samples 1206 from its auto-associative portion. The pseudo samples are reinjected via a feedback path 1208, which may involve noise injection, as described above.

Training data generated using the ANN 1200 is for example used to train a further ANN 1210, and/or a further ANN 1220.

The ANN 1210 is also of the type of the ANN 300 of FIG. 3, comprising both auto-associative and hetero-associative portions, and has an input layer 1212, and an output layer generating pseudo labels 1214 from its hetero-associative portion, and pseudo samples 1216 from its auto-associative portion. A training system 1216, which is for example implemented in hardware and/or by software, is for example configured to train the network 1210 using the training data, by providing pseudo samples to the input layer 1212, receiving the resulting output data 1214 and 1216, and adjusting accordingly the parameters θ of the network 1210. In this case, the training data for example includes the pseudo data values Xm, X(m+1), X(m+2), etc., that were injected into the network 1200, the corresponding pseudo labels Ym, Y(m+1), Y(m+2), etc., resulting from the injection of each respective pseudo data value Xm, X(m+1), X(m+2), etc., and the replicated pseudo samples Xm', X(m+1)', X(m+2)', etc., resulting from the injection of each respective pseudo data value Xm, X(m+1), X(m+2), etc. Indeed, the training system 1216 is for example configured to train not only the hetero-associative portion of the network 1210 based on the pseudo sample/pseudo label pairs, but also to train the auto-associative portion of the network 1210 based on the pseudo sample/replicated pseudo sample pairs. Indeed, the latter training involves training the auto-associative portion of the network 1210 to generate the same differences as the network 1200 between the injected pseudo samples, and the replicated pseudo samples at its output.

The ANN 1220 is an ANN classifier, like the example of FIG. 1, comprising an input layer 1222, and an output layer generating pseudo labels 1224. A training system 1226, which is for example implemented in hardware and/or by software, is for example configured to train the network 1220 using the training data, by providing pseudo samples to the input layer 1222, receiving the resulting output pseudo labels 1224, and adjusting accordingly the parameters θ of the network 1220. Thus, in this case, the training data does not for example include the replicated pseudo samples Xm', X(m+1)', X(m+2)', etc., resulting from the injection of each respective pseudo data value Xm, X(m+1), X(m+2), etc. in the network 1200.

Figure 12B:
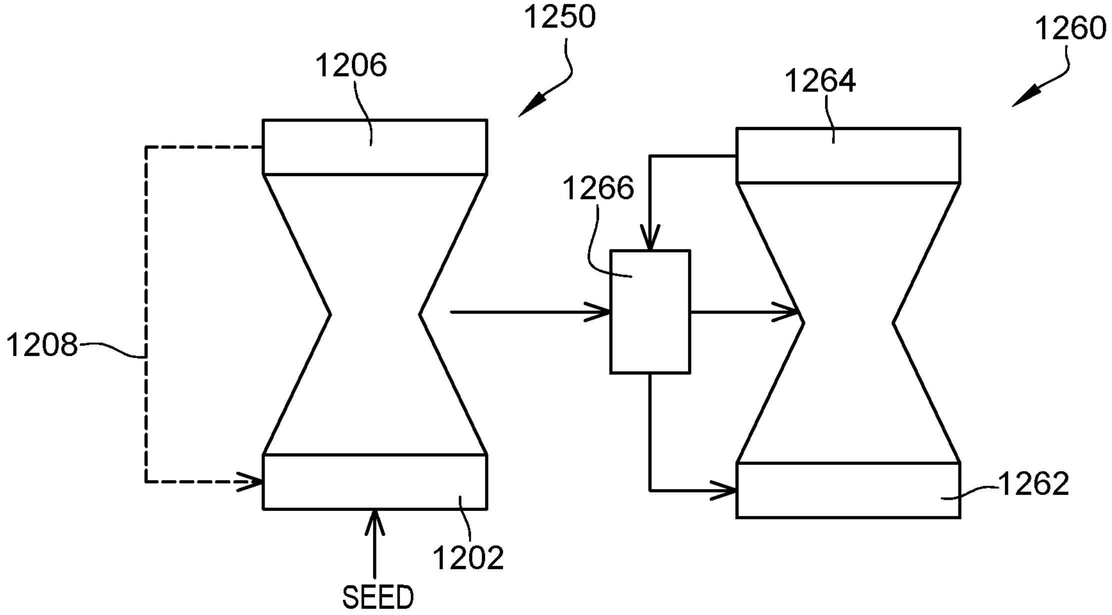
FIG. 12B schematically illustrates a system for knowledge transfer according to yet a further example embodiment of the present disclosure.

FIG. 12B schematically illustrates a system for knowledge transfer according to yet a further example embodiment of the present disclosure.

In the example of FIG. 12B, a trained ANN 1250 is of the type of the ANN 1100 of FIG. 11, implementing only an auto-associative function. The ANN 1250 is represented in a similar manner to the ANN 1200, except that the pseudo label outputs 1204 are no longer present.

Training data generated using the ANN 1250 is for example used to train a further ANN 1260, which is for example similar to the ANN 1250, comprising an input layer 1262, and an output layer 1264. A training system 1266, which is for example implemented in hardware and/or by software, is for example configured to train the network 1260 using the training data, by providing pseudo samples to the input layer 1262, receiving the resulting output data 1264, and adjusting accordingly the parameters θ of the network 1260. In this case, the training data for example includes the pseudo data values Xm, X(m+1), X(m+2), etc., that were injected into the network 1250, and the replicated pseudo samples Xm', X(m+1)', X(m+2)', etc., resulting from the injection of each respective pseudo data value Xm, X(m+1), X(m+2), etc.

Figure 13:
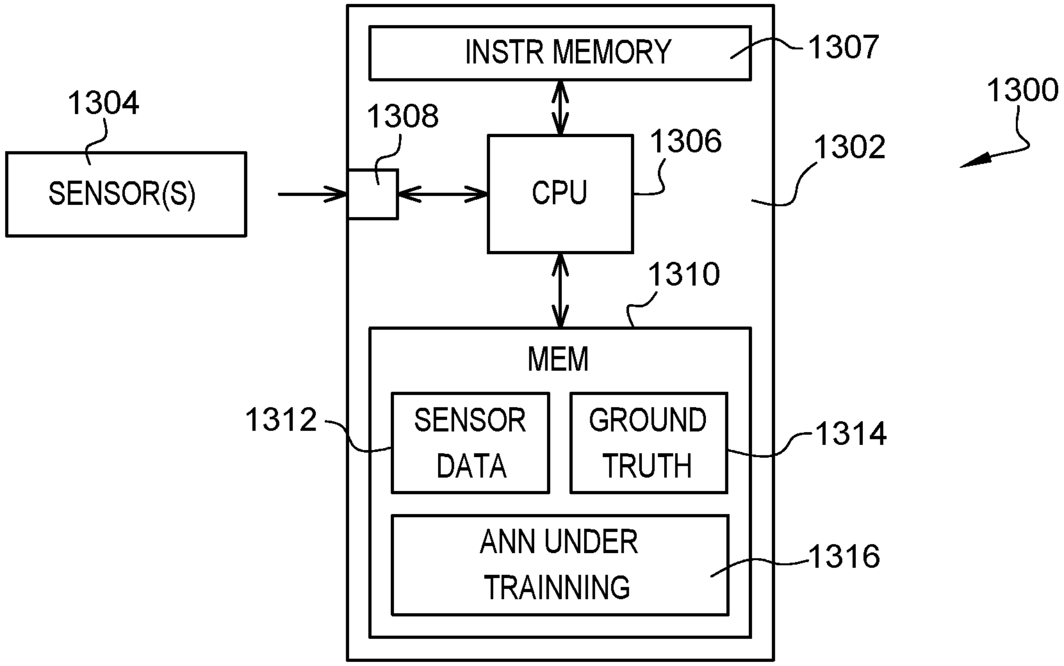
FIG. 13 schematically illustrates a system for ANN training according to an example embodiment.

FIG. 13 schematically illustrates a system 1300 for ANN training according to an example embodiment. The system 1300 for example comprises a computing system 1302 and one or more sensors (SENSOR(S)) 1304.

The one or more sensors 1304 for example comprise one or more image sensors, depth sensors, heat sensors, microphones, or any other type of sensor.

The computing system 1302 for example comprises a processing device 1306 comprising one or more CPUs (Central Processing Units), under control of instructions stored in an instruction memory (INSTR MEMORY) 1307. Alternatively, rather than CPUs, the computing system 1302 could comprise one or more NPUs (Neural Processing Units), or GPUs (Graphics Processing Units), under control of the instructions stored in the instruction memory 1307.

The computing system 1302 also for example comprises an interface 1308 coupling the processing device 1306 to the one or more sensors 1304, and a further memory (MEM) 1310 accessible by the processing device 1306. The memory 1310 for example stores sensor data (SENSOR DATA) 1312 captured by the one or more sensors 1304, and in some cases ground truth data (GROUND TRUTH) 1314 for use during training. For example, in some embodiments, the ground truth data is captured by one or more of the sensors 1304 dedicated to capturing the ground truth. Alternatively, the ground truth may be entered via another means.

The memory 1310 also for example stores a representation (ANN UNDER TRAINING) 1316 of the ANN during its training. For example, the ANN 1316 is fully defined as part of a program stored by the instruction memory 1307, including the definition of the structure of the ANN, i.e. the number of neurons in the input and output layers and in the hidden layers, the number of hidden layers, the activation functions applied by the neuron circuits, etc. Furthermore, parameters of the ANN learned during training, such as its parameters and weights, are for example stored in the memory 1310. In this way, the ANN 1316 can be trained within the computing environment of the computing system 1302.

In some embodiments, the computing system 1302, and in particular the instruction memory 1307, processing device 1306, and memory 1310, further implements the system 400 or 1000 for knowledge transfer, permitting the knowledge learned by the neural network 1316, once its training is complete, to be transferred to the further neural network, which is also for example represented in the memory 1310.

Figure 14:
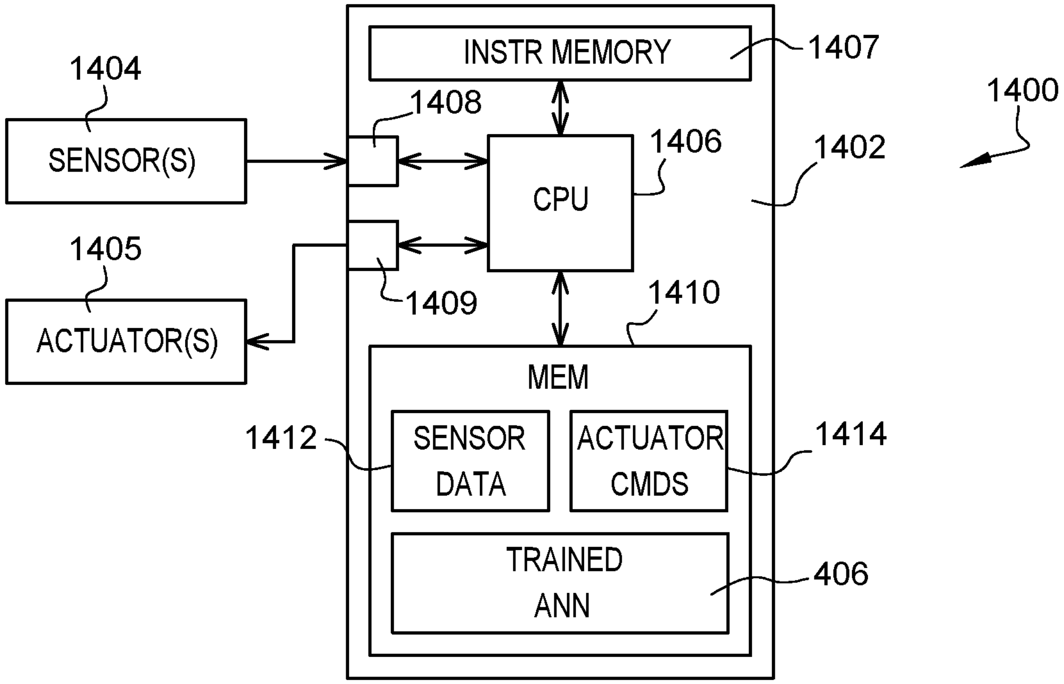
FIG. 14 schematically illustrates a hardware system comprising an ANN according to an example embodiment of the present disclosure.

FIG. 14 schematically illustrates a hardware system 1400 comprising an ANN according to an example embodiment of the present disclosure.

The system 1400 for example comprises a computing system 1402, one or more sensors (SENSOR(S)) 1404 and one or more actuators 1405.

The one or more sensors 1404 are for example similar or of the same type as the sensors 1304 of FIG. 3. For example, the sensors 1404 comprise one or more image sensors, depth sensors, heat sensors, microphones, or any other type of sensor.

The actuators 1405 for example comprise a robot, such as a robotic arm trained to pull up weeds, or to pick ripe fruit from a tree, or could include automatic steering or breaking systems in a vehicle, or operations of circuit, such as waking up from or entering into a sleep mode, or even a display screen for influencing an environment.

The computing system 1402 for example comprises a processing device 1406 comprising one or more CPUs (Central Processing Units), under control of instructions stored in an instruction memory (INSTR MEMORY) 1407. Alternatively, rather than CPUs, the computing system 1402 could comprise one or more NPUs (Neural Processing Units), or GPUs (Graphics Processing Units), under control of the instructions stored in the instruction memory 1407.

The computing system 1402 also for example comprises an interface 1408 coupling the processing device 1406 to the one or more sensors 1404, an interface 1409 coupling the processing device 1406 to the one or more actuators 1405, and a further memory (MEM) 1410 accessible by the processing device 1406. The memory 1410 for example stores sensor data (SENSOR DATA) 1412 captured by the one or more sensors 1404, and in some cases one or more actuator commands (ACTUATOR CMDS) 1414 for controlling the actuators 1405.

The memory 1410 also for example stores a representation of the trained ANN (TRAINED ANN) 406. In particular, this ANN has been trained by knowledge transfer as described herein based on generated training data. For example, the ANN 406 is fully defined as part of a program stored by the instruction memory 1407, including the definition of the structure of the ANN, i.e. the number of neurons in the input and output layers and in the hidden layers, the number of hidden layers, the activation functions applied by the neuron circuits, etc. Furthermore, parameters of the ANN learned during training, such as its parameters and weights, are for example stored in the memory 1410. In this way, the ANN can be trained and operated within the computing environment of the computing system 1402.

In operation, the computing system 1402 is for example configured to control the one or more actuators 1405 by capturing sensor data using the sensors 1404, applying this sensor data to the trained artificial neural network 406 to generate an output value at one or more of its outputs, and controlling the actuators 1405 based on the output value.

While in the examples of FIGS. 13 and 14 the ANNs 1316 and 406 are implemented in software, either or both of these ANNs could be implemented by dedicated hardware, or by a combination of dedicated hardware and software.

An advantage of the embodiments described herein is that training data can be generated that captures relatively well interesting areas of the input space of a given function, such that training one or more new networks can be performed relatively quickly and precisely. For example, by using, for each seed injection, at least two points, excluding a first point, on a trajectory of pseudo samples generated by reinjection into a trained auto-associative network, the present inventors have found that particular effective training data can be generated. Particularly relevant training data can be generated in the case of a classifier by detecting when a class boundary is traversed, and using the points on either side of the class boundary. The relatively high accuracy of the embodiments described herein is demonstrated in FIG. 15.

Figure 15:
FIG. 15 is a graph representing learning accuracy according to three learning strategies.

FIG. 15 is a graph representing learning accuracy against the number of training batches, and illustrates three curves corresponding to three learning strategies.

A curve 1502 illustrates learning based on real data, which comes in this example from the MNIST (Mixed National Institute of Standards and Technology) dataset.

A curve 1504 illustrates learning based on training data generated by a trained network as described herein. In particular, the training data is formed of reinjected pseudo samples as described herein, according to which all of the reinjected pseudo samples originating from a same seed are used to form the pseudo samples of the training data. It can be seen that the accuracy is close to that of the curve 1502, particularly once the number of training batches exceeds around 50.

A curve 1506 illustrates learning based on a reinjection approach similar to the one described herein, but according to which only the last reinjection of a series of reinjections originating from a same seed is used to form a pseudo sample for training. It can be seen that the accuracy is significantly lower according to such a method.

A further advantage of the embodiments described herein is that, unlike many previously proposed solutions, the solution proposed herein is entirely agnostic as regards the relation between the trained ANN or ANNs, and the target ANN or ANNs to which the knowledge is to be transferred. The solution also permits to respect the data privacy of a data set used to train the trained ANN, and for example permits two or more trained ANNs to generate training data that is used to train a single further ANN.

Various embodiments and variants have been described. Those skilled in the art will understand that certain features of these embodiments can be combined and other variants will readily occur to those skilled in the art. For example, while embodiments have been described in which untrained ANNs are trained using training data, it would also be possible to transfer one or more of the parameters of the trained ANN, such as the learnt weights of a first layer of the ANN, to the untrained ANN in order to speed up the knowledge transfer. Indeed, even if the models of the trained and untrained ANNs are not the same, it may be possible to transfer at least some of the parameters.

Finally, the practical implementation of the embodiments and variants described herein is within the capabilities of those skilled in the art based on the functional description provided hereinabove. For example, the training of an ANN using a deep learning technique is well known to those skilled in the art and has not be described in detail.

The invention claimed is:

1. A method of generating training data for transferring knowledge from a trained artificial neural network to a further artificial neural network, the method comprising:

a) injecting a first sample into the trained artificial neural network, the first sample being a real sample or a random sample, wherein the trained artificial neural network has been trained using a dataset of sensor data and is configured to implement at least an auto-associative function for replicating input samples at one or more of its outputs to provide a replicated sample;

b) reinjecting a pseudo sample, generated based on the replicated sample present at the one or more outputs of the trained artificial neural network, into the trained artificial neural network in order to generate a new replicated sample at the one or more outputs; and c) repeating b) one or more times to generate a plurality of reinjected pseudo samples;

providing at least two of said reinjected pseudo samples originating from the first sample and corresponding at least two output values generated by the trained artificial neural network to the further artificial network for training the further artificial neural network.

2. The method of claim 1, wherein the trained artificial neural network, or another trained artificial neural network, is configured to implement a classification function, and wherein the corresponding output values of the training data comprise pseudo labels generated by the classification function based on the reinjected pseudo samples.

3. The method of claim 2, further comprising detecting, based on said pseudo labels, when a boundary between two pseudo label spaces is traversed between consecutive reinjections of two of the pseudo samples, wherein the at least two reinjected pseudo samples forming the training data comprise at least said two consecutively reinjected pseudo samples.

4. The method of claim 2, wherein the pseudo labels are unnormalized outputs of the classification function.

5. The method of claim 1, wherein the further artificial neural network is configured to implement at least an auto-associative function for replicating input samples at one or more of its outputs, and wherein the corresponding output values of the training data comprise the new replicated samples generated by the auto-associative function of the trained artificial neural network based on the reinjected pseudo samples.

6. The method of claim 1, further comprising:

d) repeating a), b) and c) at least once based on new first samples in order to generate, on each repetition, at least two further reinjected pseudo samples forming the training data.

7. The method of claim 1, further comprising, prior to injecting the first sample into the trained artificial neural network, randomly selecting the first sample from a set of real data samples.

8. The method of claim 1, wherein the first sample is a random sample comprising a random value, the method further comprising generating the random sample based on a normal distribution or based on a tuned uniform distribution.

9. The method of claim 1, wherein generating the pseudo sample comprises injecting noise into the replicated sample present at the one or more outputs of the trained artificial neural network.

10. The method of claim 1, further comprising, prior to injecting the first sample into the trained artificial neural network, capturing sensor data using one or more sensors and training an artificial neural network based on the sensor data in order to create the trained artificial neural network.

11. A method of transferring knowledge from a trained artificial neural network to one or more further artificial neural networks, the method comprising:

generating training data using the method of claim 1; and training the one or more further artificial neural networks based on the generated training data, the one or more further artificial neural networks being configured to control one or more actuators.

12. A method of controlling one or more actuators comprising:

transferring knowledge to a further artificial neural network according to the method of claim 11;

capturing further sensor data using one or more further sensors, wherein the further sensor data is for example of a same type as the sensor data used to train the trained artificial neural network;

applying the further sensor data to the further artificial neural network to generate an output value at one or more outputs of the further artificial neural network; and controlling the one or more actuators based on the output value.

13. A system for generating training data for transferring knowledge from a trained artificial neural network to a further artificial neural network, the system comprising a data generator configured to:

a) inject a first sample into the trained artificial neural network, the first sample being a real sample or a random sample, wherein the trained artificial neural network has been trained using a dataset of sensor data and is configured to implement at least an auto-associative function for replicating input samples at one or more of its outputs to provide a replicated sample;

b) reinject a pseudo sample, generated based on the replicated sample present at the one or more outputs of the trained artificial neural network, into the trained artificial neural network in order to generate a new replicated sample at the one or more outputs; and c) repeating b) one or more times to generate a plurality of reinjected pseudo samples;

providing at least two of said reinjected pseudo samples originating from the first sample and corresponding at least two output values generated by the trained artificial neural network to the further artificial network for training the further artificial neural network.

14. The system of claim 13, further comprising the further artificial neural network, and a training system configured to train the further artificial neural network based on the training data.

15. The system of claim 14, wherein the trained artificial neural network, or another trained artificial neural network, is configured to implement a classification function, and wherein the data generator is configured to generate the training data to further comprise pseudo labels generated by the classification function based on the reinjected pseudo samples, and wherein the further artificial neural network is capable of implementing a classification function.

16. The system of claim 13, wherein the first sample is a random sample, the system further comprising a seed generator configured to generate the random sample based on a normal distribution or based on a tuned uniform distribution.

17. The system of claim 13, wherein the data generator is configured to generate the pseudo sample by injecting noise into the replicated sample present at the one or more outputs of the trained artificial neural network.

18. The system of claim 13, wherein the data generator is further configured, prior to injecting the first sample into the trained artificial neural network:

to capture sensor data using one or more sensors; and to train an artificial neural network based on the sensor data in order to create the trained artificial neural network.

19. A system comprising:

one or more further sensors;

one or more actuators; and an actuator control device comprising the further artificial neural network of claim 13, wherein the actuator control device is configured to:

capture further sensor data using the one or more further sensors, wherein the further sensor data is for example of a same type as the sensor data used to train the trained artificial neural network;

apply the further sensor data to the further artificial neural network to generate an output value at one or more outputs of the further artificial neural network; and control the one or more actuators based on the output value.

20. The method of claim 11, wherein the one or more actuators include a robot, an automatic steering or braking system in a vehicle, or operations of a circuit.

* * * * *